US007113990B2

(12) United States Patent
Scifres et al.

(10) Patent No.: US 7,113,990 B2
(45) Date of Patent: Sep. 26, 2006

(54) SYSTEM AND PROCESS FOR ALLOCATING FLOW CAPACITY IN A NETWORK

(75) Inventors: Mark Alan Scifres, Champaign, IL (US); Jeremy A. Shaffner, Champaign, IL (US); Timothy Michael Yardley, Champaign, IL (US)

(73) Assignee: Distributed Management Information Systems, Inc., Savoy, IL (US)

( * ) Notice: Subject to any disclaimer, the term of this patent is extended or adjusted under 35 U.S.C. 154(b) by 0 days.

(21) Appl. No.: 11/149,577

(22) Filed: Jun. 10, 2005

(65) Prior Publication Data

US 2005/0226153 A1    Oct. 13, 2005

Related U.S. Application Data

(63) Continuation of application No. 10/157,440, filed on May 29, 2002, now Pat. No. 6,912,574.

(51) Int. Cl.
*G06F 15/153* (2006.01)
*G06F 11/00* (2006.01)
*G06F 19/00* (2006.01)

(52) U.S. Cl. ............... 709/224; 709/223; 370/230; 370/235; 702/64

(58) Field of Classification Search .................. None
See application file for complete search history.

(56) References Cited

U.S. PATENT DOCUMENTS

| | | | |
|---|---|---|---|
| 5,381,413 A | 1/1995 | Tobagi et al. | |
| 5,694,390 A | 12/1997 | Yamato et al. | |
| 5,799,002 A | 8/1998 | Krishnan | |
| 5,892,754 A * | 4/1999 | Kompella et al. | 370/236 |
| 6,003,062 A | 12/1999 | Greenberg et al. | |
| 6,046,980 A | 4/2000 | Packer | |
| 6,047,322 A | 4/2000 | Vaid et al. | |
| 6,085,241 A | 7/2000 | Otis | |
| 6,141,686 A | 10/2000 | Jackowski et al. | |
| 6,167,445 A | 12/2000 | Gai et al. | |
| 6,198,750 B1 | 3/2001 | Buchholz et al. | |
| 6,222,856 B1 | 4/2001 | Krishnan et al. | |
| 6,230,203 B1 | 5/2001 | Koperda et al. | |
| 6,282,208 B1 | 8/2001 | Bowcutt et al. | |
| 6,285,658 B1 | 9/2001 | Packer | |
| 6,286,052 B1 | 9/2001 | McCloghrie et al. | |
| 6,301,674 B1 * | 10/2001 | Saito et al. | 713/340 |
| 6,339,784 B1 | 1/2002 | Morris et al. | |
| 6,343,085 B1 | 1/2002 | Krishnan et al. | |
| 6,459,682 B1 | 10/2002 | Ellesson et al. | |
| 6,678,248 B1 * | 1/2004 | Haddock et al. | 370/235 |
| 6,681,232 B1 | 1/2004 | Sistanizadeh et al. | |
| 2002/0032535 A1 * | 3/2002 | Alexander et al. | 702/64 |
| 2002/0152305 A1 | 10/2002 | Jackson et al. | |

* cited by examiner

*Primary Examiner*—Wen-Tai Lin
(74) *Attorney, Agent, or Firm*—Kudirka & Jobse, LLP (57) ABSTRACT

A flow allocation system includes a set of collection agents, a set of restriction agents, a processing agent and at least one usage limit selected from a volume limit set and a rate limit set. The flow allocation system is implemented between a set of usage devices and a service network. The collection agents monitor flows between the usage devices and the service network. The processing agent sums the flows for each of the usage devices, determines whether any of the summed flows reach the usage limit, and selects at least one flow restriction rule for the subset of usage devices reaching the usage limit. The set of restriction agents implement the flow restriction control rule for the subset of usage devices reaching the usage limit. The processing agent also uses exception handling techniques to shift usage quotas for the usage devices.

6 Claims, 8 Drawing Sheets

SYSTEM AND PROCESS FOR ALLOCATING FLOW CAPACITY IN A NETWORK

CROSS-REFERENCE TO RELATED APPLICATIONS

This application claims priority to and is a continuation of commonly assigned U.S. patent application Ser. No. 10/157,440, filed May 29, 2002 now U.S. Pat. No. 6,912,574, by Mark A. Scifres, Jeremy A. Shaffner and Timothy M. Yardley, and entitled "SYSTEM AND PROCESS FOR ALLOCATING FLOW CAPACITY IN A NETWORK", the subject matter of which is incorporated herein by reference for all purposes.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to feedback systems and, more particularly, to a feedback system for allocating flows between a service network and a group of usage devices.

2. Related Art

There are a number of computer networks that have a system for limiting access to the networks based on the capacity of the input/output (I/O) devices. When the I/O devices become overburdened by computers accessing the networks, prior art systems restrict the flow rate of certain computers based on predefined usage profiles, user information and/or data types. These systems are typically used for congestion control of the computer networks, not based on past usage of the computer networks.

Other systems are based on a model of providing quality of service levels to certain users of the computer networks and/or certain types of data being communicated through the computer networks. For example, some systems would differentiate between the service provided based on a priority that has been assigned to the users or based on a priority assigned to the types of data. The higher the priority, the more bandwidth or the quicker the information will be transferred through the computer networks. In these related systems, bandwidth rules are generally not implemented according to past usage of the computer networks. Some prior art systems use rate-limits to support a quality of service by scaling back users with large transfers. However, a number of these systems are based on inefficient processes to determine the rate-limits for those users with large transfers and due to the inefficient processes, these systems require complex systems to implement the rate-limits.

For example, related systems have been based on multiple transfer limits and have individually implemented rate-limits for each user. Checking transfers for each user against multiple limits can significantly increase processing times and may require more expensive processors in some circumstances. Additionally, individually implementing rate-limits for each user is inefficient and may not result in a fair allocation of resources. Some related systems also suggest changing communication paths depending on whether the system is in a monitoring mode of operation or in a management mode of operation, and some even require multiple processors for a single router.

Accordingly, there remains the need for a flow allocation system which limits users in an efficient manner and using a less complex system when the users have reached a usage limit. Additionally, there remains a need for a flow allocation system that limits users based on usage limits and also provide exception handling of the users that have reached a usage limit. There also remains a need for a flow allocation system that can limit a subset of users as a group rather than on an individual basis when each member of the subset has exceeded the usage limit.

SUMMARY OF THE INVENTION

It is in view of the above problems that the present invention was developed. The invention is a flow allocation system that includes a set of collection agents, a set of restriction agents, a processing agent and at least one usage limit. The flow allocation system is implemented between a set of usage devices and a service network, and the usage limit is selected from sets of volume limits and rate limits. The collection agents monitor flows between the usage devices and the service network. The processing agent sums the flows for each of the usage devices, determines whether any of the summed flows reach the usage limit, and selects at least one flow restriction rule for the subset of usage devices reaching the usage limit. The set of restriction agents implement the flow restriction control rule for the subset of usage devices reaching the limit. The processing agent may also use exception handling techniques to shift usage quotas for the usage devices. Additionally, the flow allocation system can provide multiple subsets of usage devices with different levels of service that are selected from maximum flow rates and usage limits.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
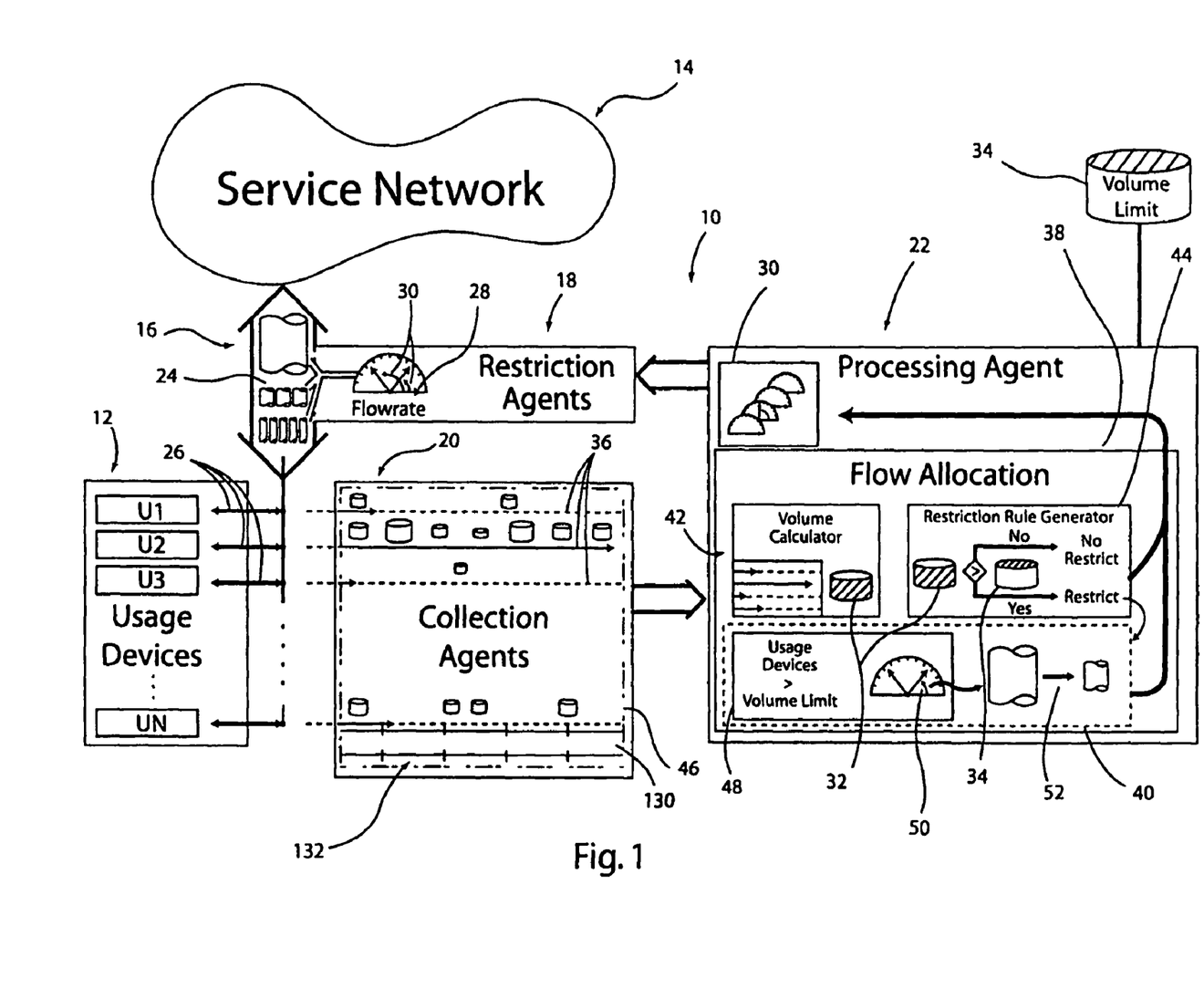
FIG. 1 illustrates a flow allocation system according to the present invention.

Referring to the accompanying drawings in which like reference numbers indicate like elements, FIG. 1 illustrates a flow allocation system 10 for a group of usage devices 12 accessing a service network 14 through a portal 16. Generally, the flow allocation system 10 has a set of restriction agents 18, a set of collection agents 20 and a processing agent 22 in communication with the restriction agents 18 and the collection agents 20. Some elements of the flow allocation system 10 may be in-line between the usage devices 12 and the service network 14, such as the restriction agents 18 and possibly the collection agents 20. Preferably, the processing agent 22 is not in-line between the usage devices 12 and the service network 14.

The restriction agents 18 are in-line with the portal 16 and provide the usage devices 12 with access to the service network 14. In particular, the restriction agents 18 allow the usage devices 12 to access the service network through the portal 16 according to a set of flow levels 24. According to the flow levels 24, a set of flows 26 is transferred through the restriction agents 18 between the service network 14 and the usage devices 12. The portal 16 to the service network has a maximum total flow rate 28, and the restriction agents 18 allocate a portion thereof to the flows 26 according to a set of flow restriction rules 30. Each one of the usage devices 12 has a unique identity (U1, U2, U3, . . . , UN) within the flow allocation system 10, and the restriction agents 18 implement the flow restriction rules 30 corresponding with the flows 26 for each of the usage devices 12. Accordingly, the restriction agents 18 define the level of the flows 26 between each of the usage devices 12 and the service network 14.

As discussed in detail below, the flow restriction rules 30 are determined by the processing agent 22 and are preferably based on a flow volume 32 for each of the usage devices 26 as compared with at least one volume limit in a volume limit set 34. Additionally, as discussed in detail below, the flow restriction rules 30 may allocate the entire portion of the flow rate 28 to any subset of usage devices depending on the flow volume 32 for each of the corresponding usage devices 26.

The set of collection agents 20 monitors the flows 26 between the usage devices 12 and the service network 14. In particular, the collection agents 20 gather flow information 36 for the flows 26 between each of the usage devices 12 and the service network 14. The flow capacity for the set of the usage devices 12 accessing the service network 14 is the total of the flow volumes 32 over time.

The processing agent 22 has a flow allocation module 38 that generates the flow restriction rules 30 according to a relationship 40 between the flow volume 32 for each of the usage devices 12 and volume limit set 34. For example, as shown in the table below, the volume limit set 34 (VLA, VLB, VLC, . . . ) can have a multiplexed correspondence with the set of usage devices 12 (U1, U2, U3, . . . , UN) according to the relationship 40. In general, the volume limits 34 correspond with the set of usage devices 12 according to the subset of volume limits selected from the volume limit set 34. It will be appreciated that the volume limit set 34 can be assigned to the set of usage devices 12 according to known matrix operations that can result in different volume limit subsets for the usage devices. It should also be appreciated that the volume limit set 34 must have at least one volume limit 34 within its set and may have additional volume limits.

In the case where a single volume limit is in the set, only the one-to-all subset of volume limits (ONE:ALL) can be generated. In such a case, each of the usage devices 12 that is subject to the set of volume limits would also be subject to the same single volume limit. When multiple volume limits are in the volume limit set 34, additional volume subsets can be generated in addition to the one-to-all subset. In particular, the one-to-one subset of volume limits (ONE:ONE) and the one-to-many subset of volume limits (ONE:MANY) can be generated in a number of different combinations. As shown in Table 1 below, each one of the volume limits in the set is uniquely assigned one of the usage devices 12 in the one-to-one subset. For the one-to-many subset, volume limits can be assigned to the usage devices in any number of combinations between one-to-one and one-to-all.

TABLE 1

| Volume Limits | Usage Devices | ONE:ALL | ONE:ONE | ONE:MANY |
|---|---|---|---|---|
| VLA | U1 | U1 ⇒[VLA] | U1 ⇒[VLA] | U1 ⇒[VLA] |
| VLB | U2 | U2 ⇒[VLA] | U2 ⇒[VLB] | U2 ⇒[VLA] |
| VLC | U3 | U3 ⇒[VLA] | U3 ⇒[VLC] | U3 ⇒[VLC] |
| . | . | . | . | . |
| . | . | . | . | . |
| . | . | . | . | . |
| VL . . . | UN | UN ⇒[VLA] | UN ⇒[VL . . . ] | UN ⇒[VLC] |

As exemplified by Table 1, any set of usage devices 12 may be subject to a number of different volume limits 34.

The flow allocation module 36 generates the restriction rules 30 using a volume calculator 42 in communication with a restriction rule generator 44. The volume calculator 42 receives or otherwise monitors and obtains the flow information 36 from the collection agents 20 for each of the respective usage devices 12 during a time period 46. The volume calculator sums the flow information 36 into the flow volume 32 for each of the usage devices 12 during the time period 46 and communicates, or otherwise makes available, the flow information 36 to the restriction rule generator 44 for each of the usage devices 12.

According to the relationship 40, the restriction rule generator identifies each one the usage devices 48 that has a flow volume 32 equal to or exceeding its corresponding volume limit 34. These identified usage devices 48 are a subset of the entire set of usage devices 12, and it will be appreciated that the subset of identified usage devices may actually be a null set if none of the usage devices 12 exceeds its corresponding volume limit 34. In the case where none of the usage devices 12 exceeds its corresponding volume limit 34, the restriction rule generator will not apply any flow restriction control rule 50. The restriction rule generator 44 ranks each of the identified usage devices 48 according to the flow volume 32 exceeding the corresponding volume limit 34 and generates the set of flow restriction rules 30 for each of the identified usage devices 48. The set of flow restriction rules 30 are formed by associating at least one flow restriction control rule 50 to the subset of identified usage devices 48. The flow restriction control rule 50 operates by commanding an adjustment to the portion of the total flow rate 52 for each of the identified usage devices 48. The processing agent 22 communicates the set of flow restriction rules 30 to the set of restriction agents 18, and the restriction agents 18 implement the set of flow restriction rules 30 which are in line with the portal 16 for each of the usage devices 12.

As described above, the preferred embodiment is described with reference to a set of volume limits 34 compared with flow volumes 32. It will be appreciated that the flow allocation module 36 may also generate the restriction rules 30 based on a set of rate limits (RLA, RLB, RLC, . . . ) in a similar manner as the volume limits discussed above. In particular, rate limits can be assigned to each one of the usage devices 12 as shown in Table 2 below. The volume calculator 42 may sum the flow information 36 into the flow volume 32 for each of the usage devices 12 during the time period 46, and an average flow rate can be calculated by dividing the flow volume 32 by the time period 46 for each of the usage devices 12. Accordingly, the flow information 36 for each of the usage devices 12 would be the average flow rate calculated according to the flow usage calculations.

TABLE 2

| Rate Limits | Usage Devices | ONE:ALL | ONE:ONE | ONE:MANY |
|---|---|---|---|---|
| RLA | U1 | U1 ⇒[RLA] | U1 ⇒[RLA] | U1 ⇒[RLA] |
| RLB | U2 | U2 ⇒[RLA] | U2 ⇒[RLB] | U2 ⇒[RLA] |
| RLC | U3 | U3 ⇒[RLA] | U3 ⇒[RLC] | U3 ⇒[RLC] |
| . | . | . | . | . |
| . | . | . | . | . |
| . | . | . | . | . |
| RL . . . | UN | UN ⇒[RLA] | UN ⇒[RL . . . ] | UN ⇒[RLC] |

It will also be appreciated that a set of collection agents 20 may be used to measure an average flow rate or instantaneous flow rate, and in such a case, the volume calculator 42 could integrate the flow rates over time to calculate flow volume. Therefore, any volume limit or rate limit respectively selected from the set of volume limits and the set of rate limits is generally grouped in the category of a usage limit. Similarly, the set of flow restriction rules 30 are preferably applied as a restricted flow rate as discussed above and could also be applied as a restricted flow volume in a similar manner, and any restricted flow rate or restricted flow volume respectively selected from the set of flow restriction rules is generally grouped in the category of a restricted flow usage level. A restricted flow volume could even be implemented with rate restrictions that are integrated over time. It will also be appreciated that the set of collection agents 20 and the processing agent 22 can determine and compare flow volumes and/or flow rates with the usage limit corresponding with the state of the transferred flows being monitored.

Figure 2:
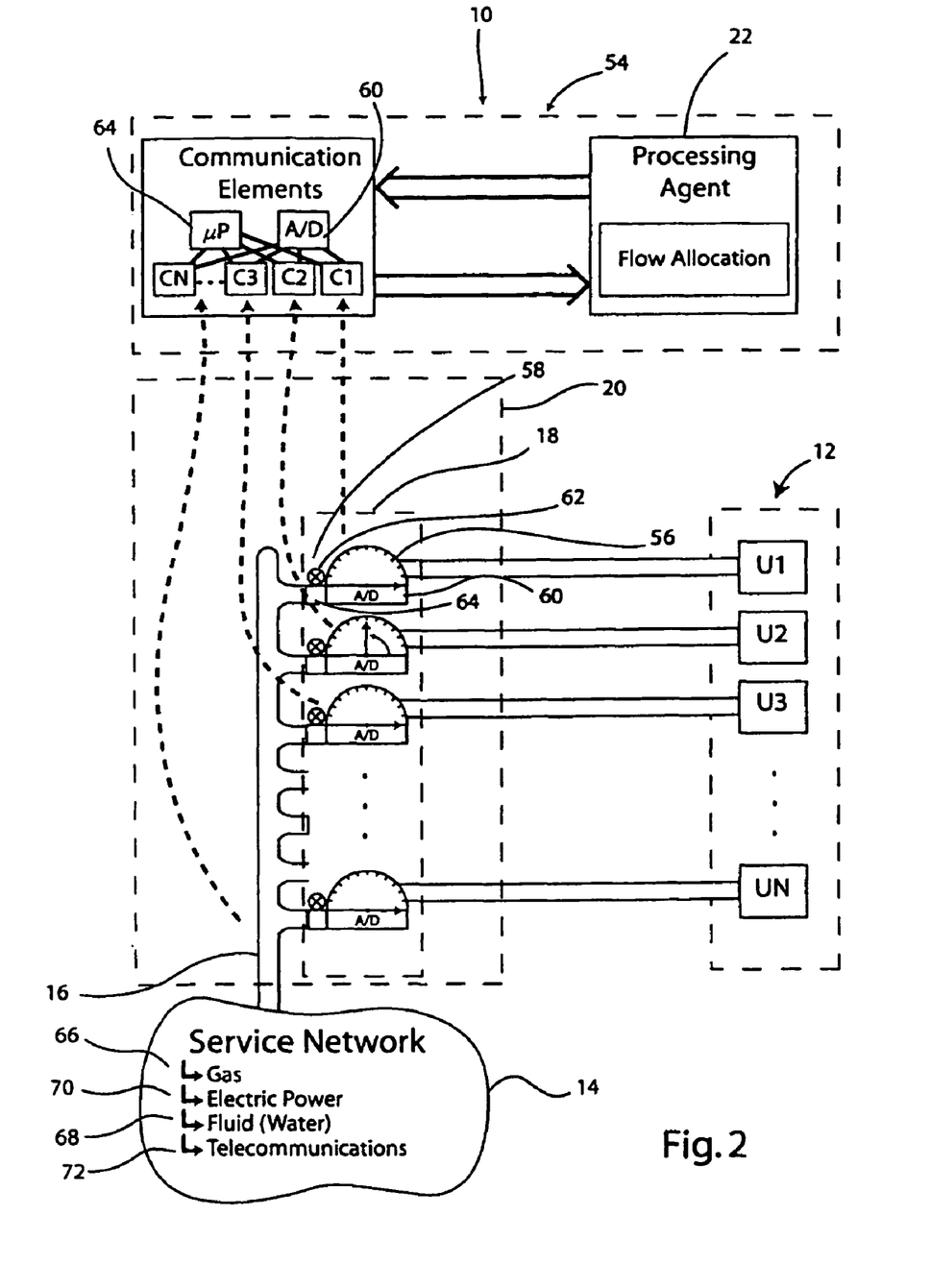
FIG. 2 illustrates the flow allocation system according to the present invention as implemented in an out-of-band network.

As illustrated in FIG. 2, the flow allocation system 10 of the present invention may be implemented in an out-of-band control network 54. The out-of-band control network 54 may be used with any service network 14 whose flows 26 do not inherently communicate the flow information 36 that is required by the processing agent 22. For example, a service network 14 that is a fluid distribution network would include a portal 16 for transferring the fluid to the usage devices 12, but the fluid being transferred through the portal does not inherently contain the flow information 36 that the processing agent 22 needs to determine flow volume 30.

In such a fluid distribution network, each one of the restriction agents 18 could have a measuring element 56 and an actuator element 58. The measuring element 56 would preferably include an analog to digital converter 60 (A/D converter), and the actuator element would preferably include an actuated valve 64 coupled with a microprocessor 64. These additional elements are necessary to transform the fluid states into flow information 36 that can be communicated to the processing agent 22 and to transform the flow restriction rules 30 into physical actions by the restriction agents 16 on the fluid being transferred from the portal 16 to the usage devices 12. Examples of the fluid distribution network include a water delivery network 66 and a gas delivery network 68.

The out-of-band control network 54 may be used with other types of service networks, such as an electric power network 70 and a telecommunications and/or data communications network 72. In these types of networks, the combination of the measuring element 56 and the actuator element 58 with each one of the restriction agents 18 and corresponding usage devices 12 can be generally referred to as a communication device, and the A/D converter 60 and microprocessor 64 can be generally referred to as communication elements. In the out-of-band network 54, the processing agent 22 monitors and controls the flow rate 28 through the measuring elements 56 and the actuator elements 58, respectively.

Figure 3:
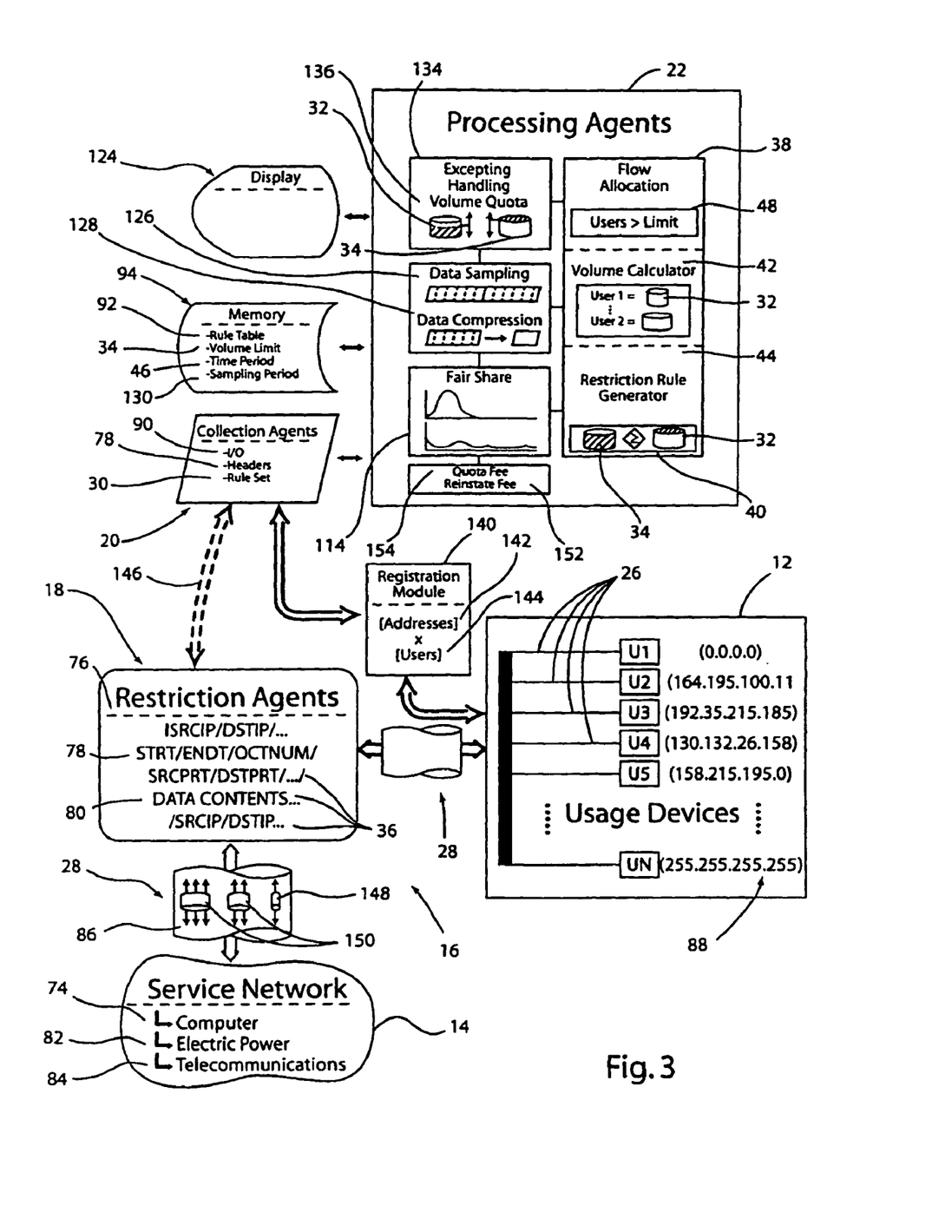
FIG. 3 illustrates the flow allocation system according to the present invention as implemented in a computer network.

FIG. 3 illustrates the preferred embodiment of the flow allocation system 10, as implemented in a service network 14 whose flows 26 inherently communicate flow information 36 that is used by the processing agent 22. A computer network 74 is one example of a service network 14 with inherently communicated flow information 36. In a computer network 74, the flows 26 are purely data flows 76. The data flows 76 contain the flow information 36 in data headers 78 and also contain data contents 70. Certain electric power networks and telecommunications networks are other examples of a service network 14 which may contain flow information 36 in addition to its flows 26. For example, an intelligent electric power network 82 may have data flows 76 communicated over its electricity flows. Similarly, a multi-casting telecommunications network 84 may also include data flows 76 in addition to its broadcast signal flows or in addition to bi-directional cell flows. Therefore, although details of the preferred embodiment of the flow allocation system 10 are discussed with reference to allocating bandwidth 86 to the usage devices 12 for accessing a computer network 74, it will be appreciated that the flow allocation system 10 is also generally applicable to flows 26 in any type of service network 14. Of course, usage devices 12 connected to the computer network 74, the intelligent electric power network 82 or the multi-casting telecommunications network 84 would include communication devices for processing the data flows 76.

As particularly illustrated in FIG. 3, data flows 76 between the computer network 74 and the usage devices 12 may be consistent with standard communication protocols, such as Internet Protocol (IP) and User Datagram Protocol (UDP). As discussed above, each one of the usage devices 12 has a unique identity (U1, U2, U3, . . . , UN) within the flow allocation system 10, and according to the example for the preferred embodiment, the unique identity may be a uniquely identifiable address, such as an IP address 88. Accordingly, the data header 78 for each of the respective flows 26 preferably includes the source IP address (SRCIP), the destination IP address (DSTIP), the size of the entire flow in an octet byte (COUNT), the source port (SRCPRT) and the destination port (DSTPRT). Additionally, the data header 78 may also include the start time (STRT) and the end time (ENDT) for each of the data flows 26.

In the preferred embodiment of the allocation flow system 10, the processing agent 22 can be a single computer processor in communication with the restriction agents 18, and the restriction agents 18 can be implemented in a router, a bridge or a switching device which may be generally described as the portal 16 between the usage devices 12 and the computer network 74. It is also possible for the restriction agents 18 to be integrated into the computer processor itself and for the computer processor to reframe the data headers 78 in the flows 26. In the preferred embodiment, where the flow information 36 is integral with the flows 26, the collection agents 20 may be nothing more than an input/output (I/O) interface 90 to the processing agent 22. Similarly, the set of flow restriction rules 30 can be communicated to the restriction agents 18 through the I/O interface 90. However implemented in the allocation flow system 10, the restriction agents 18 allocate a portion of the flow rate 28 through the portal 16 to the flows 26, such as bandwidth 86, and the allocation is implemented according to the flow restriction rules 30.

Figure 4:
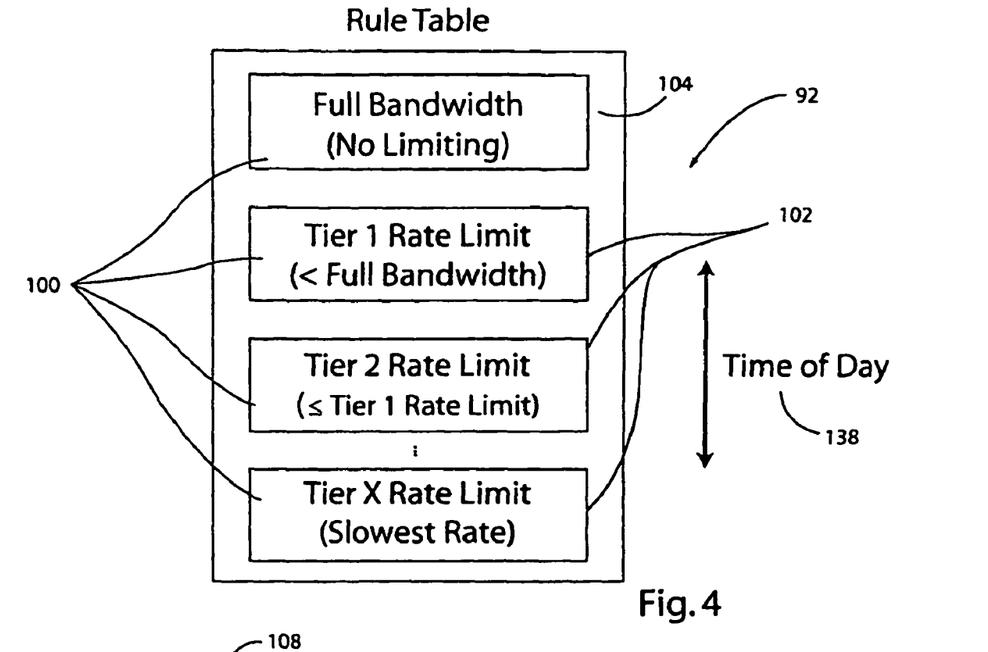
FIG. 4 illustrates a rule table used by the flow allocation system.

The set of flow restriction rules 30 may be selected from a rule table 92 that is stored in a memory module 94 or may be determined dynamically within the processing agent 22. In either case, all possible sets of flow restriction rules 30 are defined either in the processing agent 22, in the rule table 92, or in the manner in which the processing agent selects the flow restriction rules 30 from the rule table 92. The volume limit set 34 and the corresponding time period 46 may also be stored in the memory module 94. Referring particularly to FIG. 4, the rule table 92 defines the flow restriction rules 30 as a set of bandwidth rules 100, including a set of rate-limit rules 102 less than the maximum bandwidth rate 104 through the portal 16.

In the preferred embodiment, the flow volume 32 for each of the usage devices 12 is determined according to the flow information 36 in the data header 78 of each data flow 76. Each data flow 76 is a one-way sequence of the flows 26 between SRCIP and DSTIP. Therefore, the processing agent 22 counts the data flows 76 in both directions between the usage devices 12 and the computer network 74. Accordingly, the preferred embodiment of the present invention is able to allocate a portion of the maximum flow according to flow directions. For example, input flows that are transferred from the computer network 74 to the usage devices 12 can flow at a different level than output flows.

Returning again to the general implementation of the flow allocation system 10 according to FIGS. 1–3, the flow allocation module 38 selects the flow restriction rules 30 from the defined set of rules according to the subset of identified usage devices 48 determined by the relationship 40 between the flow volume 32 and the corresponding volume limit 34 for each of the usage devices 12. Based on the possible sets of flow restriction rules 30 and the subset of identified usage devices 48, the matrix operation defined set forth in Equation (1) below can be used to produce the particular set of flow allocation rules 30 that are to be implemented in the set of restriction agents 18.

[ALLOCATION RULES]×[IDENTIFIED USAGE DEVICES]=[RULE SET]    (1)

When at least one of the usage devices 12 is in the set of identified usage devices 48, the flow allocation module 38 can select or otherwise determine at least one rate-limit rule 102 that is less than or equal to the maximum rate 104 to create the set of flow allocation rules 30. Frequently, multiple usage devices (M) are in the set of identified usage devices 48, and the flow allocation module 38 can create the set of flow allocation rules 30 with select any one or more of the rate-limit rules 102. Accordingly, during any given time period 46, any one of the rate-limit rules 102 can be applied to any number of identified usage devices 48. Similarly, several or all of the rate-limit rules 102 can be applied to different sub-sets of identified usage devices 48.

Figure 5:
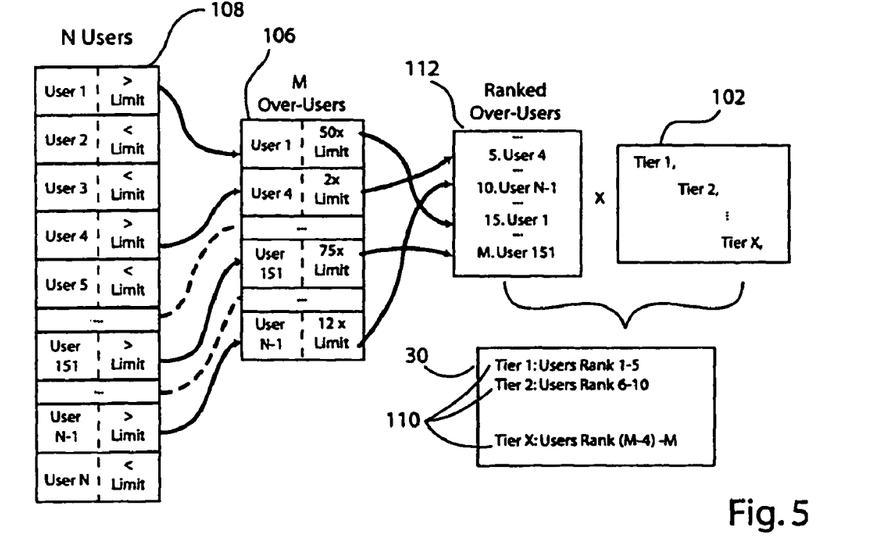
FIG. 5 illustrates the process of identifying usage devices with flow volumes exceeding corresponding volume limits.

Referring particularly to FIG. 5, the selection of the flow allocation rules 30 according to the preferred embodiment of the invention is particularly described. The processor 26 identifies M-number of usage devices 48, referred to as "M Over-Users" 106, from the set of N-number of usage devices 12, referred to as "N Users" 108. Given that there are X-number of rate-limit rules 102 of varying speeds, the set of M Over-Users 106 can be sub-divided into Over-User subsets 110 in the set of flow allocation rules 30. In particular, the Over-User subsets could be approximately equal in number according to Equation (2) below, where CEIL ( $\lceil$ $\rceil$ ) stands for the standard mathematical ceiling function.

Number of Over-Users per Subset=$CEIL$(M Over-Users)/(X Rate-Limit Rules)    (2)

According to the preferred embodiment of the present invention, only a single volume limit 34 is necessary to effectively rate-limit the M Over-Users 106 corresponding with each one of the identified usage devices 48. Additionally, according to the preferred embodiment of the present invention, the volume calculator 32 first ranks the M Over-Users 106 into a set of ranked Over-Users 112 according to the level at which each one of the M Over-Users 106 exceed their corresponding volume limit 34. The restriction rule generator 44 sub-divides and combines the Ranked Over-Users 112 with the rate-limit rules 102 to produce the Over-User subsets 110 that are communicated to the restriction agents 18 in the set of flow allocation rules 30.

It is possible that all of the flow restriction rules 30 are of the same tier, i.e., they could all have the exact same flow restriction control rule 50 less than or equal to the flow rate 28 of the portal 16. Additionally, as described above, any one of the flow restriction rules 30 can be applied to any number of identified usage devices 48. Therefore, the same flow restriction rule 30 can be applied to each one of the usage devices in the subset of identified usage devices 48, regardless of any ranking thereof. It should also be recognized that it is similarly possible to define the number (X) of flow restriction rules 30 to be equal with the number (M) of Over-Users 106 (X=M) such that each of the M Over-Users is subject to a corresponding one of the rate limit rules 30. Additionally, it is also possible that the Over-User subsets 110 could be produced by mixing into each of the Over-User subsets 110 some of the identified usage devices 48 from each of the rankings. For example, users with rankings of 1, 6, 11 and M-4 could be in one subset while users with rankings of 5, 10, 15 and M could be in another subset.

In general, the process for allocating flow rate 28 to the subset of usage devices 48 according to at least one volume limit 34 includes: defining a comprehensive set of flow restriction rules that includes at least one restricted flow rate 50; defining the volume limit 34 for the time period 46; transferring the flows 26 through the restriction agents 18; monitoring the flows 26 between the usage devices 12 and the service network 14; selecting the flow restriction rules 30 from the comprehensive set for the subset of usage devices 48 with flows 26 exceeding the volume limit 34; and allocating a portion of the flow rate 52 according to the selected flow restriction rules 30.

As discussed above, the processing agent 22 contains particular relationships that define the process for selecting the flow restriction rules 30, including: computing the flow volume 32 for each of the usage devices 12 during the time period 46 based on the monitoring of the flows 26 between the usage devices 12 and the service network 14; comparing each of the flow volumes 32 with the volume limit 34 corresponding to each of the usage devices 12; identifying the subset of usage devices 48 having flows 26 exceeding the volume limit 34; and associating each one of the usage devices in the subset of usage devices 48 with the restricted flow rate 50 in the set of flow restriction rules 30. The processing agent may also have the option of ranking each of the usage devices in the subset of identified usage devices 48 and sub-dividing the identified usage devices 48 into a number of subsets.

Returning again to the preferred embodiment of the invention as illustrated in FIG. 3, the processing agent 26 may also contain a fair share module 114. The fair share module 114 can determine the volume limit 34 according to an average flow volume and a usage-pattern for the flows 26. An average volume can be generically defined according to Equation (3) below, where the summation of flow volume is based on the flow volume 32 for each of the usage devices 12 during the time period 46.

$$\text{Average Volume} = (\Sigma \text{ Flow Volume})/\text{Number of Users} \quad (3)$$

Figure 6A:
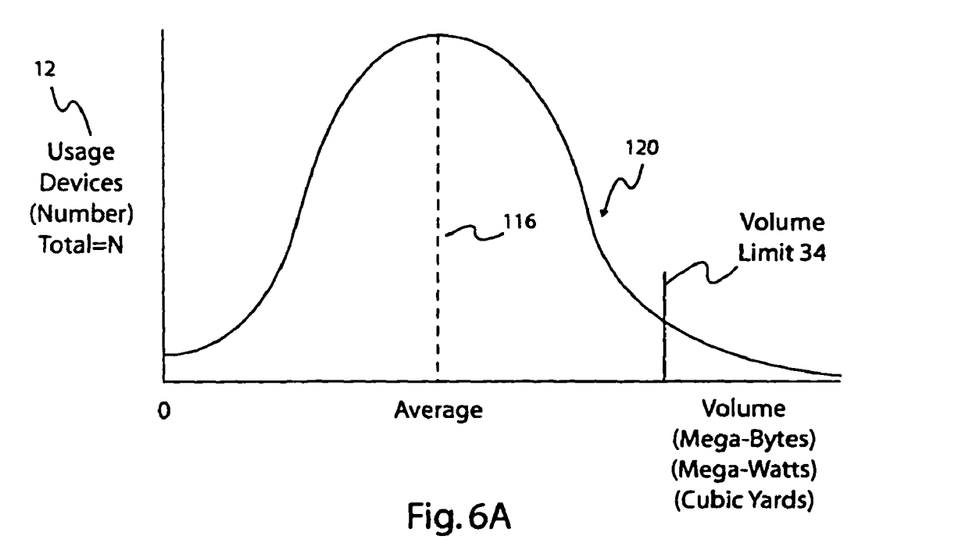
FIGS. 6A and 6B illustrate exemplary average volumes and usage patterns.
Figure 6B:
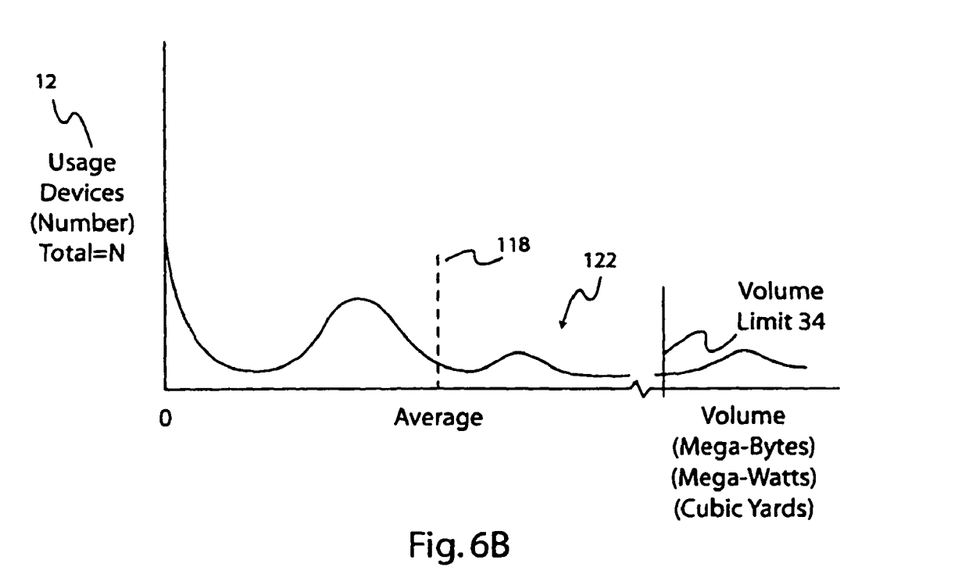

FIGS. 6A and 6B illustrate exemplary average volumes 116, 118 and usage patterns 120, 122 that may be used in determining the volume limit 34. FIG. 6A illustrates a pattern of usage 120 that statistically fits a normal distribution (also known as a Gaussian probability distribution). Based on the normal distribution, statistical variants can be predicted based on the average volume 116 and the standard deviation therefrom. For example, if the flows 26 of the usage devices 12 fit this pattern of usage 120, it is likely that usage would be restricted for only a small percentage (<1%) of the usage devices 12, those usage devices having a flow volume 32 exceeding the average volume 116 by almost three times the standard deviation. Of course, in a normal distribution, it is also possible that most of the usage devices 12 are maximizing usage of the service network, in which case, there may be no restriction for only a small percentage of the usage devices 12. Therefore, the volume limit 34 could generally depend on the proximity of the average volume 116 to the maximum overall capacity (maximum flow rate over time) of the service network 14 through the portal 16, where the standard deviation of the pattern of usage 120 measures the proximity.

However, the normal distribution is not a good real-life predictor of the data flows 76 communicated between the usage devices 12 and a computer network 74. Generally, the usage devices 12 accessing the computer network 74 would be servers, workstations, personal computers, personal digital assistants (PDA), and other types of communication devices having a digital computer processor. With the computer network 74, some of these usage devices 12 may generate very small or no data flows 76 with the computer network 74 (many times not using the computer network for extended period of time or for very limited purposes, such as e-mails without large attachments). Additionally, there are a number of usage devices 12 that disproportionately generate many, large data flows 76. In real life situations, this disproportionate generation of data flows 76 can be orders of magnitude greater than the average volume 118. FIG. 6B illustrates this real-life pattern of usage 122. In this case, a better volume limit 34 may be based more on determining a level of usage that is disproportionate from a fair share usage of the computer network 74. As one example, the volume limit 34 could be calculated by multiplying the average volume 118 by a usage-pattern factor (Volume Limit=Usage-Pattern Factor×Average Volume). The usage-pattern factor will generally be greater than two (2), resulting in a volume limit greater than twice the average volume 118. Depending on the usage pattern 122, the usage-pattern factor may even be more than an order of magnitude greater than the average volume 118. Generally, the volume limit 34 can be determined by calculating the average volume 116, 118, selecting a corresponding usage-pattern factor 120, 122, and multiplying the average volume 116, 118 by the selected usage-pattern factor.

Usage patterns 120, 122 can be graphed on a display module 124 in communication with the processing agent 22. Additionally, usage patterns can be identified by their fit with statistical distributions that may be stored in the memory module 94. For example, pattern of usage 120 would fit a normal distribution, whereas pattern of usage 122 would be better fit with a geometric distribution, and may be better fit by examining the interquartile ranges between the medians of low-use and high-use groups. Of course, a set of usage pattern factors could also be used to generate the set of volume limits and rate limits shown above in Table 1 and Table 2, respectively.

The processing agent 26 will also preferably contain a data sampling module 126 and a data compression module 128. The data sampling module 126 defines a plurality of sampling periods 130 from an initial sampling period to a final sampling period within the time period 46 and a sliding window 132 that has a length and a sliding increment. The length of the sliding window 132 is equal to the length of the time period 46, and the sliding increment of the sliding window 132 can be equal to the time period 46, the sampling period 130, or any time range between the sampling period 130 and the time period 46. Each time period 46 is sequenced according to the sliding increment of the sliding window 132, and length of each sequential time period 46 is preferably twenty-four hours. The data sampling module 126 repeatedly measures the flows 26 during each of the sampling periods 130. The data compression module summarizes the flow information 36 as historical information. The historical information can be used to generate and compare usage patterns 120, 122 over time.

The processing agent 26 also preferably contains an exception handling module 134 that shifts a set of volume quotas 136 for the entire set of usage devices 12, the subset of identified usage devices 48, and/or for any chosen usage device in the entire set 12 or the subset 48. The set of volume quotas 136 can be based on any one or combination of the flow restriction rules 30, the flow volume 32, and/or the volume limit 34. The exception handling module 134 shifts any of the volume quotas 136 to support predefined beneficial activities and to discourage harmful activities. For example, it may be beneficial to encourage certain usages of the service network at non-peak times. In some circumstances, non-peak time may be during overnight hours of each weekday, and the exception handling module 134 can adjust the volume quotas 136 according to a time of day shift 138. In this particular example, overnight usage may be encouraged by reducing and/or temporarily removing the flow restriction rules 30 applied to the subset of identified usage devices 48. In combination with or as an alternative to shifting the flow restriction rules 30, the exception handling module 134 may only sum a portion of the flow volume 32 during the overnight hours for any of the usage devices 12. With each of the usage devices 12 being uniquely identifiable, it is also possible to increase the volume limit 34 or nullify any summation of the flows 26 or otherwise never restrict any of the chosen usage devices 12.

Given these examples of encouraging certain usage patterns, it will be evident that the exception handling module 134 is similarly situated to discourage harmful usage patterns by shifting the set of volume quotas 136. Additionally, when flow information 36 is inherent within the flows 26 between the usage devices 12 and the service network 14, such as between the communication devices and the computer network 74, the exception handling module 134 can also shift any one or all of volume quotas 136 according to preferred locations on the computer network 74. Locations on the computer network 74 can be identified in the header information 78 by SRCIP for information from the preferred locations and DSTIP for information to the preferred locations. Therefore, exception policies can also be based on the direction of flows between the computer network 74 and the usage devices 12. Additionally, the volume quotas 136 can be adjusted based on the type of information being communicated in data flows 76.

The flow allocation system 10 preferably contains a registration module 140 in communication with the usage devices 12 and the processing agent 22. The registration module 140 defines an association between the set of unique identities 142 for the usage devices 12 and a set of users 144 of the devices 12. Generally, each one of the users 144 individually registers at least one of the usage devices 12 through the registration module 140. It is possible for a single user in the set of users 144 to register multiple usage devices, in which case the flow volume 32 for each one of usage devices registered to the user can optionally be grouped and summed together to calculate an overall flow volume 32 for all of the user's registered usage devices.

Figure 7:
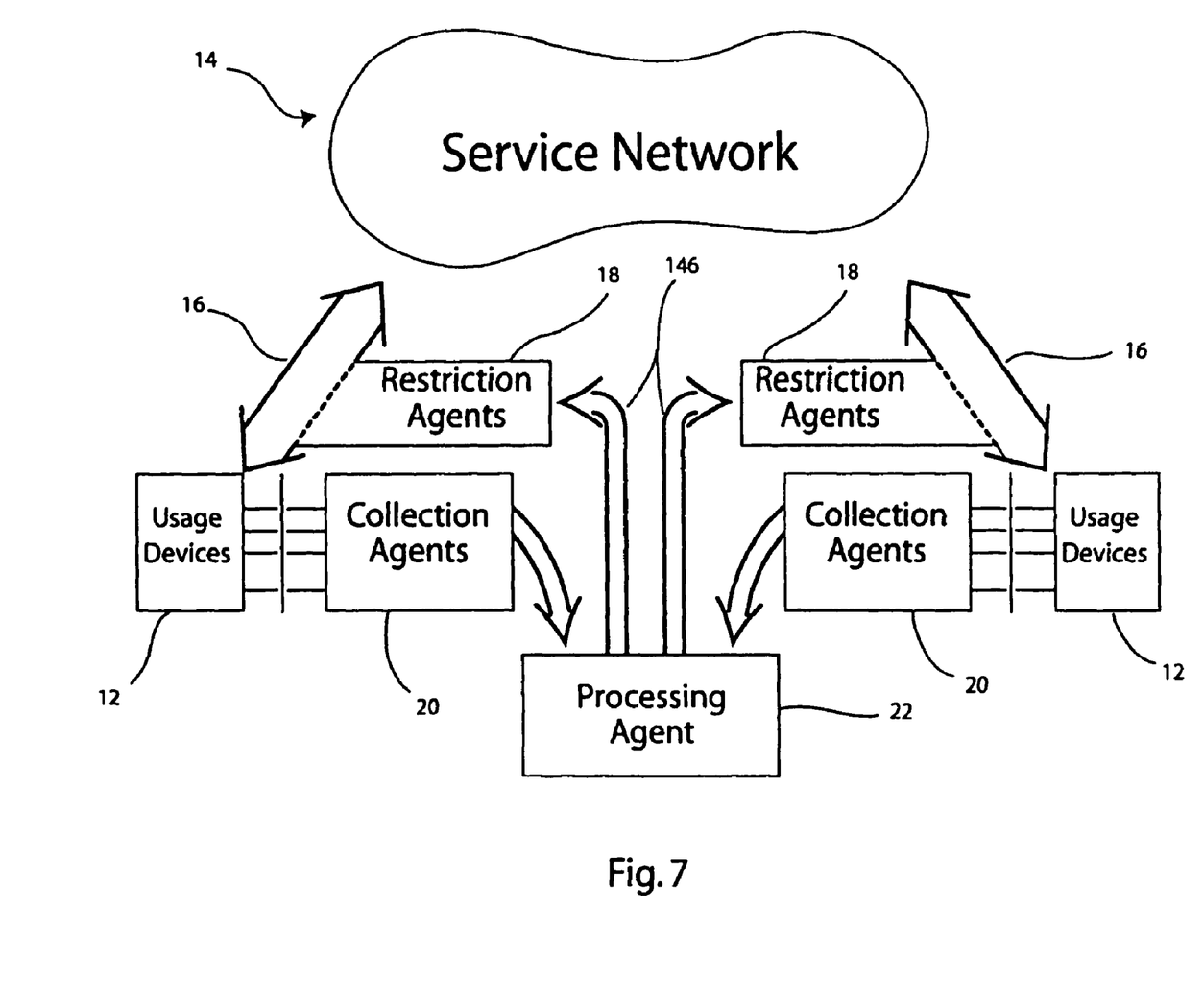
FIG. 7 illustrates an alternative embodiment of the bandwidth allocation system.

An alternative embodiment of the present invention is illustrated in FIG. 7. According to the alternative embodiment, a single processing agent 22 is used in the flow allocation system 10 with multiple sets of usage devices 12 accessing the service network 14 through multiple portals 16 and corresponding sets of restriction agents 18. In this embodiment, the processing agent is in communication with both sets of restriction agents and selects sets of flow allocation rules for the different sets of usage devices 12. In each embodiment of the invention, a single, unchanging communication path 146 can be used between the processing agent 22 and each one of the restriction agents 18. It will also be appreciated that multiple processing agents can be used in the flow allocation system 10.

In allocating the portion of the flow rate 52 according to the selected flow restriction rules 30, it is also possible to define and/or configure alternative pathways or pipelines, either physical or virtual depending on the type of service network 14, that may be shared by the usage devices 12. In particular, with reference to configuring virtual pipelines for data flows 76 between the usage devices 12 and the computer network 74, the identified usage devices 48 may all be allocated to a single restricted bandwidth pipeline 148 while those usage devices that are not in the set of identified usage devices may also be allowed to use the restricted bandwidth pipeline 148 while also being permitted to use additional pipelines 150 that are less restricted or may even be permitted to use the entire flow rate 28 of the portal 16 without any restriction other than instantaneous throughput. In such a situation, the identified usage devices 48 are excluded from these additional pipelines 150 and from the flow rate 28 of the portal 16.

The flow allocation system 10 of the present invention may also require the payment of a reinstatement fee 152 to remove a usage device from the identified subset 48 and thereby remove the restricted flow rate 50 from the usage device. Similarly, the flow allocation system 10 of the present invention may allow for the payment of an incremental usage fee 152 to adjust the volume quota 136 for a usage device. In particular, the incremental usage fee 152 can be used to increase the volume limit for the usage device from the standard volume limit generally set for the usage devices.

As discussed above, restriction rules 30 are selected from the category of a restricted flow usage level, and the particular types of restricted flow usage level include the restricted flow rate and the restricted flow volume. Similarly, the category of usage limits includes the rate limit and the volume limit as particular types within its general grouping. Regardless of the type of restricted flow usage level that is selected or the usage limit that is selected, the present invention is configured differently from prior art systems and operates differently from prior art processes in its individual application of the usage limits to each one of the usage devices in combination with grouping the usage devices into subsets in which each member of the subset has exceeded the usage limit.

Figure 8A:
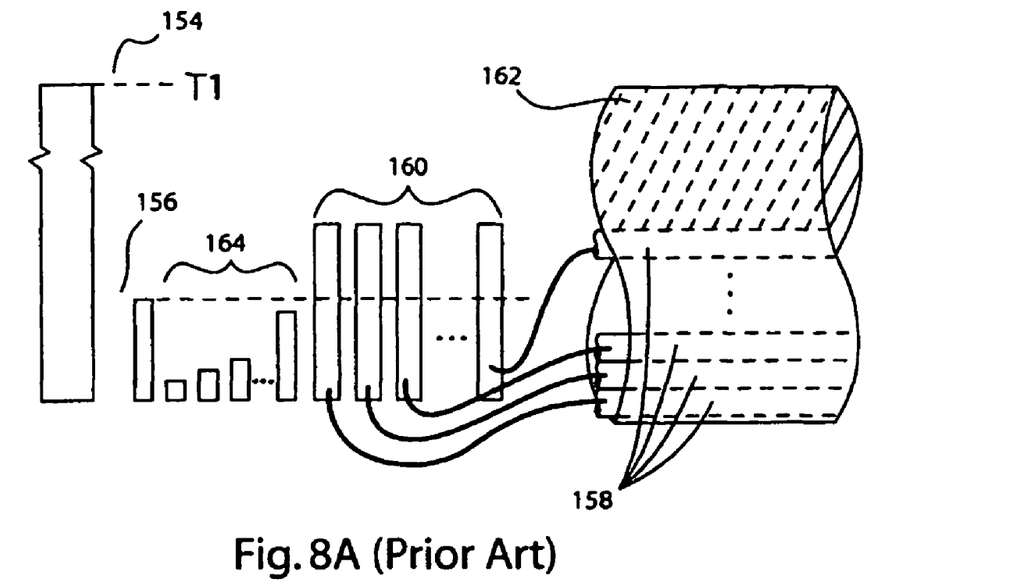
FIGS. 8A and 8B illustrate a diagrammatic comparison between the prior art and the present invention.
Figure 8B:
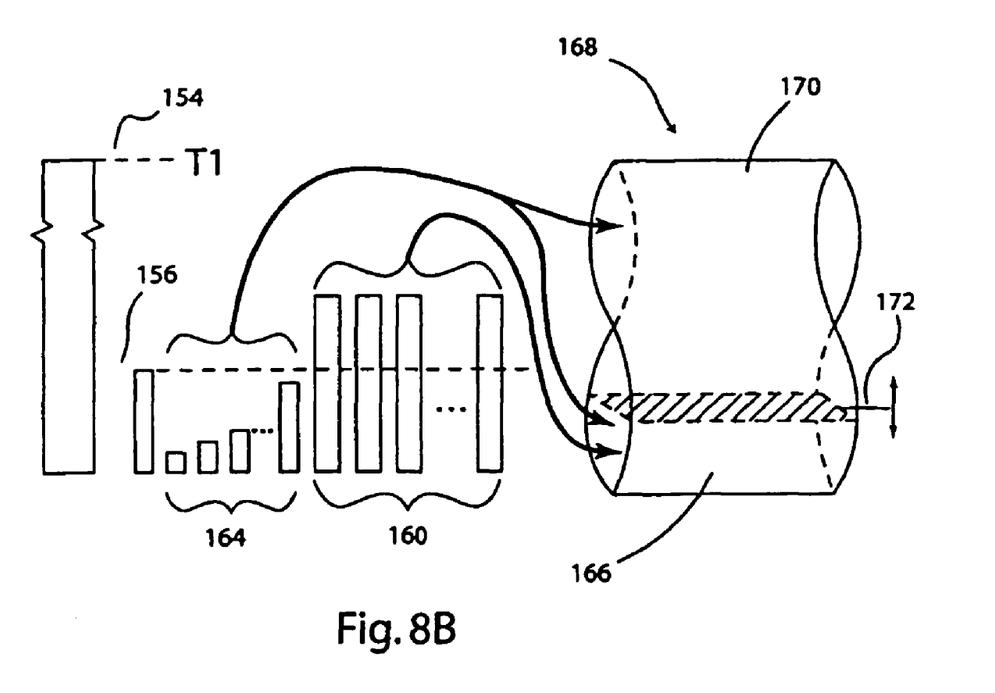

The difference between the prior art systems and methods and the present invention can be described with a particular example that according to the illustrations in FIGS. 8A and 8B, respectively. In general, each one of the usage devices compete for the same bandwidth in the prior art systems and methods, regardless of past usage levels that may have exceeded a usage limit. In the prior art, the maximum flow rate is reduced for usage devices that have exceeded a usage level, but there is no subset grouping of these limit-exceeding usage devices to restrict any usage device in the subset as a whole to only a portion of the bandwidth, thereby forcing each limit-exceeding usage device to compete for bandwidth with other limit-exceeding usage devices. The present invention does group the limit-exceeding usage devices into a subset so that the other usage devices (that have not exceeding a limit) can be guaranteed a larger portion of the bandwidth than all of the limit-exceeding usage devices combined.

For the particular example, there are one thousand (1,000) usage devices that can access the internet network through a single T1 line that has a maximum flow usage level 154 equal to a total maximum flow rate of approximately 1.54 megabits/second (Mb/sec). Accordingly, for each twenty-four (24) hour period, the T1 line provides a total volume capacity of over 16 gigabytes (GB) for all of the usage devices combined. At least one usage limit 156 is set as a volume limit of 200 Mb for each of the usage devices, which would be equivalent to an average rate limit of 18.5 kilobits/sec (kb/sec). A restricted flow usage level 158 can be set as a rate limit of 15 kb/sec for each of those usage devices that have a flow usage level 160 that exceeds the usage limit 156.

Referring to the prior art system and process illustrated in FIG. 8A, each usage device with a flow usage level 160 exceeding the usage limit 156 is individually penalized by the restriction rule 158. However, it will be appreciated that even if such a flow restriction 158 is applied to each of the limit-exceeding usage devices, the limit-exceeding usage devices are still competing for the same bandwidth that is being consumed by the other usage devices 164, the usage devices that did not exceed the usage limit 156. Further, when the flow restriction is imposed on the basis of each individual usage device, prior art systems still allow the limit-exceeding usage devices to consume more than one-half of the bandwidth and effectively reduce the bandwidth available 162 to the other usage devices that did not exceed the usage limit 156. For example, if sixty (60) limit-exceeding usage devices simultaneously access the network with another sixty (60) usage devices that did not exceed the usage limit 156, all of the usage devices would be limited to less than 15 kb/sec, regardless of whether they had exceeded the usage limit 156 or not.

In comparison, given the same example, the present invention results in a more equitable allocation of resources as between the limit-exceeding usage devices 160 and the other usage devices 164 that have not exceeded the usage limit 156. As discussed in detail above, the subset of limit-exceeding usage devices 160 are collectively restricted to only a bandwidth portion 166, is preferably set to less than one-half the total bandwidth 168 (i.e., less than one half of the total maximum flow rate 154). Additionally, the remainder of the usage devices 164 can collectively share the in the total bandwidth 168, including the greater-than-half bandwidth portion 170 (without any of the limit-exceeding usage devices 160) and the less-than-half bandwidth portion 166 (with the limit-exceeding usage devices 160). Therefore, sixty (60) limit-exceeding usage devices that simultaneously access the network would all be restricted to a smaller bandwidth 166 while another sixty (60) usage devices that did not exceed the usage limit 156 would share the entire bandwidth 170. Accordingly, the limit-exceeding usage devices 160 are not allowed to compete for the same bandwidth that is being consumed by the other usage devices 164, and the set of rules for allocating flows to these other usage devices 164 allow greater flow transfers than the flows to the limit-exceeding usage devices 160 that are subject to the set of restriction rules.

According to the flow allocation system 10 of the present invention, the usage devices that did not exceed the usage limit have a flow rate greater than a proportional flow rate which is equal to the total maximum flow rate divided by the total number of usage devices. Additionally, when a single usage device accesses the network and the usage device has not exceeded the usage limit, the usage device preferably accesses at least 50% of the total maximum flow rate and may even be permitted to access the total maximum flow rate. The limit-exceeding usage devices 160 may also be assigned a lower priority in accessing the network. The usage quota 172 can also be increased or decreased for the limit-exceeding usage devices 160.

Figure 9:
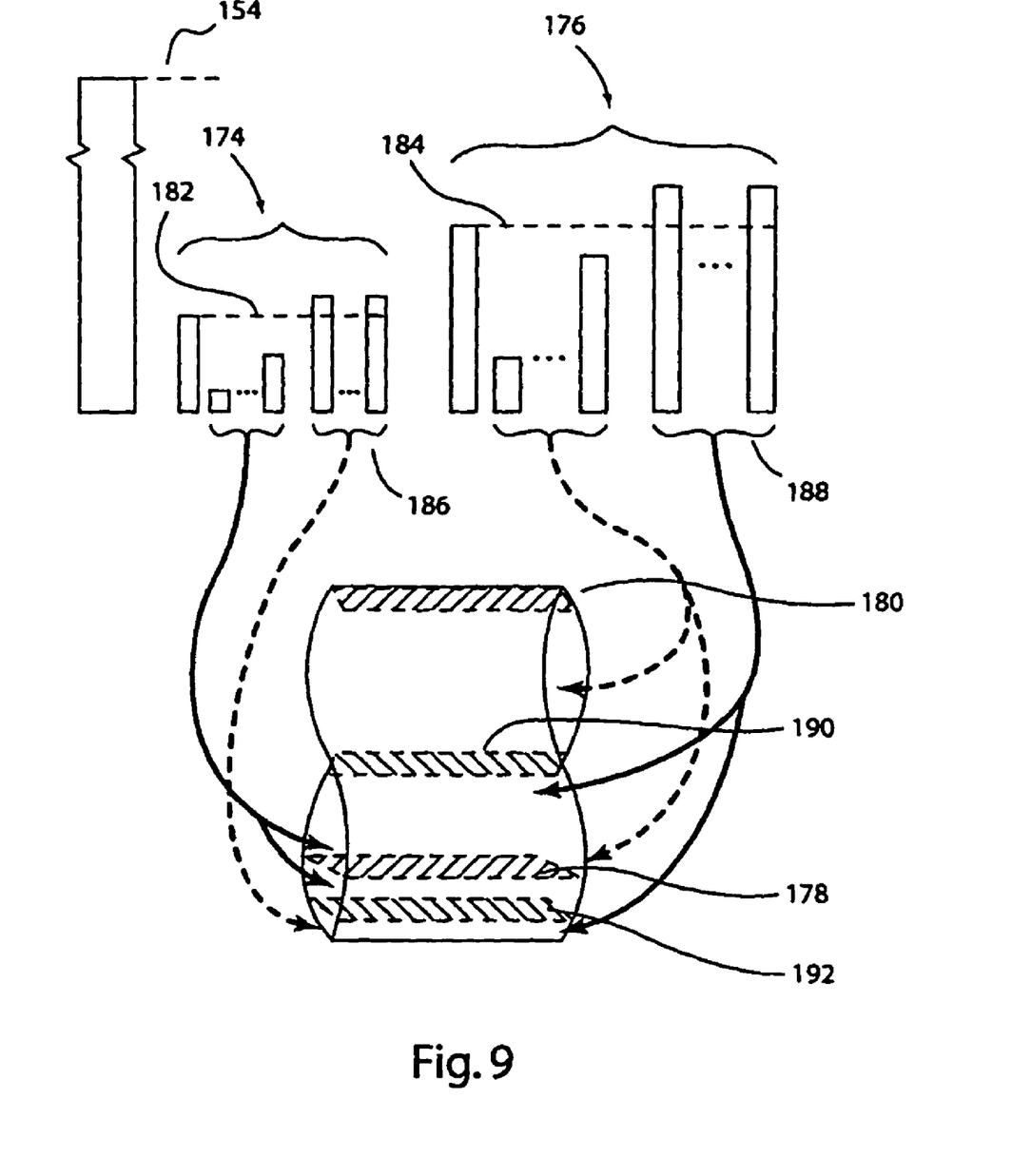
FIG. 9 illustrates a diagrammatic view of different service levels according to the present invention.

As illustrated in FIG. 9, the flow allocation system 10 can also be used to provide subsets of usage devices 12 with different levels of service 174, 176. The flow allocation module 38 can select the service levels 174, 176 from a maximum flow rate 178, 180 and a usage limit 182, 184. The basic level of service 174 has maximum flow rate 178 and usage limit 182 that is less than the maximum flow rate 180 and usage limit 184 of the enhanced level of service 176. As with the incremental usage fee 152 discussed above, the enhanced level of service 176 may be provided with the payment of a service fee or can be provided based on other considerations and conditions.

Different flow restriction rules 186, 188 can also be based on the different usage limits 182, 184 for each subset of usage devices 174, 176. In particular, the flow restriction rules 188 for the usage devices with the enhanced service level 176 would be greater than the flow restriction rules 186 for the usage devices with the basic service level 174. Preferably, the flow restriction rules 188 would still provide those limit-exceeding usage devices from the enhanced service level 176 with greater restricted usage levels 190 than the basic service level 174. For example, the maximum flow rate 178 for the basic service level 174 may be less than 20% of the total maximum flow rate 154 between the usage devices and the network being accessed, while the maximum flow rate 180 for the enhanced service level 176 may be equal to the total maximum flow rate 154. Similarly, the maximum flow rate 180 for the enhanced service level 176 can be greater than a proportional flow rate which is equal to the total maximum flow rate 154 divided by at least the total number of usage devices in the enhanced service level 176. Of course, the limit-exceeding usage devices from the enhanced service level 176 preferably have restricted usage levels 190 that are greater than the restricted usage levels for the limit-exceeding usage devices from the basic service level 174.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, it will be appreciated that the measuring element 56 and the A/D converter 60 for the usage devices 12 in the out-of-band control network 54 are used in conjunction with and may be controlled by the data sampling module 126 in the processing agent 22. Thus, the breadth and scope of the present invention should not be limited by any of the above-described exemplary embodiments, but should be defined only in accordance with the following claims appended hereto and their equivalents.

What is claimed is:

1. A method for allocating bandwidth to a set of users accessing a computer network through a portal, comprising the steps of:
   (a) defining a set of bandwidth rules for a set of restriction agents, said defined set of bandwidth rules including a plurality of rate-limit rules, wherein said rate-limit rules include a range of bandwidth limits less than a maximum allowable bandwidth;
   (b) defining a single data volume limit for a time period;
   (c) registering a set of communication devices with the set of users via a registration server, wherein each of said communication devices has a unique identity and each one of the users individually registers at least one communication device;
   (d) associating the set of users with said set of communication devices accessing the portal, wherein the portal comprises at least one restriction agent in said set of restriction agents;
   (e) communicating a set of data flows through said set of restriction agents between the set of users and the computer network, wherein said communicating step further comprises the steps of:
      (i) communicating a plurality of data headers in a set of sampling periods during said time period, and
      (ii) repeating said communicating step for a series of sequential time periods as a moving time frame;
   (f) monitoring said communicated set of data flows, wherein said monitoring step further comprises the steps of:
      (i) communicating said data headers to a processing agent during each of said sampling periods, and (ii) summarizing historical information about said data flows for each of said sequential time periods; and (g) selecting a set of bandwidth rules from said defined set of bandwidth rules, said selected set of bandwidth rules being determined by said processing agent, and wherein said selecting step comprises the steps of
  (i) allocating said monitored set of data flows to the set of users according to said association between the set of users and said set of communication devices,
  (ii) computing a data flow volume for each of the users during said time period according to said data headers,
  (iii) comparing said computed data flow volume with said single data volume limit for each of the users,
  (iv) identifying a set of the users having said computed data flow volume exceeding said data volume limit,
  (v) adding said plurality of rate limit rules to said selected set of bandwidth rules for each of the users in said identified set of users, and
  (vi) transmitting said selected set of bandwidth rules to said set of restriction agents; and (h) allocating bandwidth to said data flows according to said selected set of bandwidth rules transmitted from said processing agent to said restriction agents, wherein said data flows for said identified set of users are respectively within said plurality of rate-limit rules.

2. The method of claim 1 wherein said step for selecting said set of bandwidth rules further comprises the steps of:
ranking each of the users in said identified set of users according to said computed data flow volume for each of the users;
dividing said identified set of users into a plurality of sub-divided sets of users according to said ranking of the users;
incrementing said moving time frame; and
repeating said computing, comparing, identifying, ranking, dividing, adding, and transmitting steps for each of said series of sequential time periods.

3. A flow allocation system for a set of usage devices accessing a service network through a portal, comprising:
a set of restriction agents in-line with the portal and providing the set of usage devices with a set of flow levels to the service network through the portal, wherein a set of flows is transferred through said restriction agents between the service network and the usage devices, and wherein the portal to the service network has a total maximum flow rate and said set of restriction agents allocates a portion of said total maximum flow rate to said flows according to a set of flow restriction rules and thereby defining said set of flow levels to the service network;
a set of collection agents monitoring said set of flows and defining monitored flow information for said set of flows according to each of said usage devices; and
a processing agent in communication with said set of restriction agents and said set of collection agents, said processing agent having a flow allocation module that generates said flow restriction rules according to a relationship between said set of flows and a set of volume limits, said set of volume limits having a correspondence with said set of usage devices, said flow allocation module further comprising a volume calculator interconnected with a restriction rule generator, wherein said volume calculator sums a flow volume during a time period for each of the usage devices according to said monitored flow information and identifies a subset of usage devices with said flow volume exceeding said corresponding volume limits, and wherein said restriction rule generator creates said set of flow restriction rules for each of said identified usage devices and communicates said set of flow restriction rules to said set of restriction agents corresponding with said identified usage devices, said set of flow restriction rules being formed by associating at least one flow restriction control rule to said set of identified set of usage devices, wherein said flow restriction control rule commands an adjustment to said portion of said total maximum flow rate for each of said identified set of usage devices.

4. The flow allocation system according to claim 3, wherein said first maximum flow rate is less than 20% of a total maximum flow rate between the usage devices and the accessed network.

5. The flow allocation system according to claim 3, wherein said second maximum flow rate is greater than a proportional flow rate, said proportional flow rate being equal to a total maximum flow rate between the usage devices and the accessed network divided by at least a total number of the usage devices in said second subset of usage devices.

6. The flow allocation system according to claim 4, wherein said processing agent ranks each of the usage devices in an identified set of usage devices according to said flow volume.

* * * * *